(12) United States Patent
Nair et al.

(10) Patent No.: US 11,016,854 B2
(45) Date of Patent: May 25, 2021

(54) EFFICIENT CONTAINER BASED APPLICATION RECOVERY

(71) Applicant: INTERNATIONAL BUSINESS MACHINES CORPORATION, Armonk, NY (US)

(72) Inventors: Ambika Nair, Bangalore (IN); Mayank Singh Sachan, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 119 days.

(21) Appl. No.: 16/203,369

(22) Filed: Nov. 28, 2018

(65) Prior Publication Data
US 2020/0167234 A1   May 28, 2020

(51) Int. Cl.
| | |
|---|---|
| *G06F 11/00* | (2006.01) |
| *G06F 11/14* | (2006.01) |
| *H04L 12/24* | (2006.01) |
| *G06F 16/21* | (2019.01) |
| *G06F 8/61* | (2018.01) |

(52) U.S. Cl.
CPC ............ *G06F 11/1433* (2013.01); *G06F 8/63* (2013.01); *G06F 11/008* (2013.01); *G06F 11/1469* (2013.01); *G06F 11/1484* (2013.01); *G06F 16/219* (2019.01); *H04L 41/5016* (2013.01); *H04L 41/5045* (2013.01); *G06F 2201/815* (2013.01)

(58) Field of Classification Search
CPC ................................. G06F 16/219; G06F 8/63
See application file for complete search history.

(56) References Cited

U.S. PATENT DOCUMENTS

| | | | |
|---|---|---|---|
| 9,430,333 B2 | 8/2016 | D'Amato et al. | |
| 2014/0281709 A1 | 9/2014 | D'Amato et al. | |
| 2016/0205518 A1 | 7/2016 | Patel et al. | |
| 2016/0371127 A1* | 12/2016 | Antony | G06F 9/505 |
| 2018/0287902 A1* | 10/2018 | Chitalia | G06F 11/3006 |
| 2020/0097662 A1* | 3/2020 | Hufsmith | H04L 9/0643 |

FOREIGN PATENT DOCUMENTS

WO   2017127225 A1   7/2017

OTHER PUBLICATIONS

Kumar, Automating rollback of failed Amazon ECS deployments, Oct. 19, 2018, Amazon Elastic Container Service, 35 pages (Year: 2018).*

\* cited by examiner

*Primary Examiner* — Katherine Lin
(74) *Attorney, Agent, or Firm* — Christopher M. Pignato, Esq.; Wayne F. Reinke, Esq.; Heslin Rothenberg Farley & Mesiti P.C.

(57) ABSTRACT

Stabilizing a container-based application includes determining a health of a container. Based on the container health, a most recent stable version of an image for the container is identified. A container image is considered stable if containers spawned from the image have a relatively high MTTF and relatively low MTTR compared to other versions of same image. The container is then deployed using the most recent stable version of the image for the container.

20 Claims, 6 Drawing Sheets

EFFICIENT CONTAINER BASED APPLICATION RECOVERY

BACKGROUND

When a container is deployed, if something goes wrong during this time in a system where auto recovery is configured, a new container is deployed from the same (current) image. However, if the image itself is corrupt, recreating the container using the same image would eventually fail. There are also cases such as a web server that is stuck in an infinite loop and unable to handle new connections, even though the server process is still running.

Currently, there is a mechanism, known as auto-recovery, available to stabilize a container-based application. A new container is created to replace terminated container using same version of the container image. This mechanism is not efficient for the situation where the container image has defective code.

SUMMARY

Shortcomings of the prior art are overcome and additional advantages are provided through the provision, in one aspect, of a computer-implemented method of stabilizing a container-based application. The method includes determining a health of a container, resulting in a container health value; based on the container health, identifying a most recent stable version of an image for the container; and deploying the container using the most recent stable version of the image for the container.

In another aspect, a system for stabilizing a container-based application may be provided. The system may include, for example, memory(ies), at least one processor in communication with the memory(ies). Further, the system may include program instructions executable by the one or more processor via the memory to perform a method. The method may include, for example, determining a health of a container, resulting in a container health value; based on the container health, identifying a most recent stable version of an image for the container; and deploying the container using the most recent stable version of the image for the container.

In a further aspect, a computer program product may be provided. The computer program product may include a storage medium readable by a processor and storing instructions for performing a method. The method may include, for example, determining a health of a container, resulting in a container health value; based on the container health, identifying a most recent stable version of an image for the container; and deploying the container using the most recent stable version of the image for the container.

Further, services relating to one or more aspects are also described and may be claimed herein.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
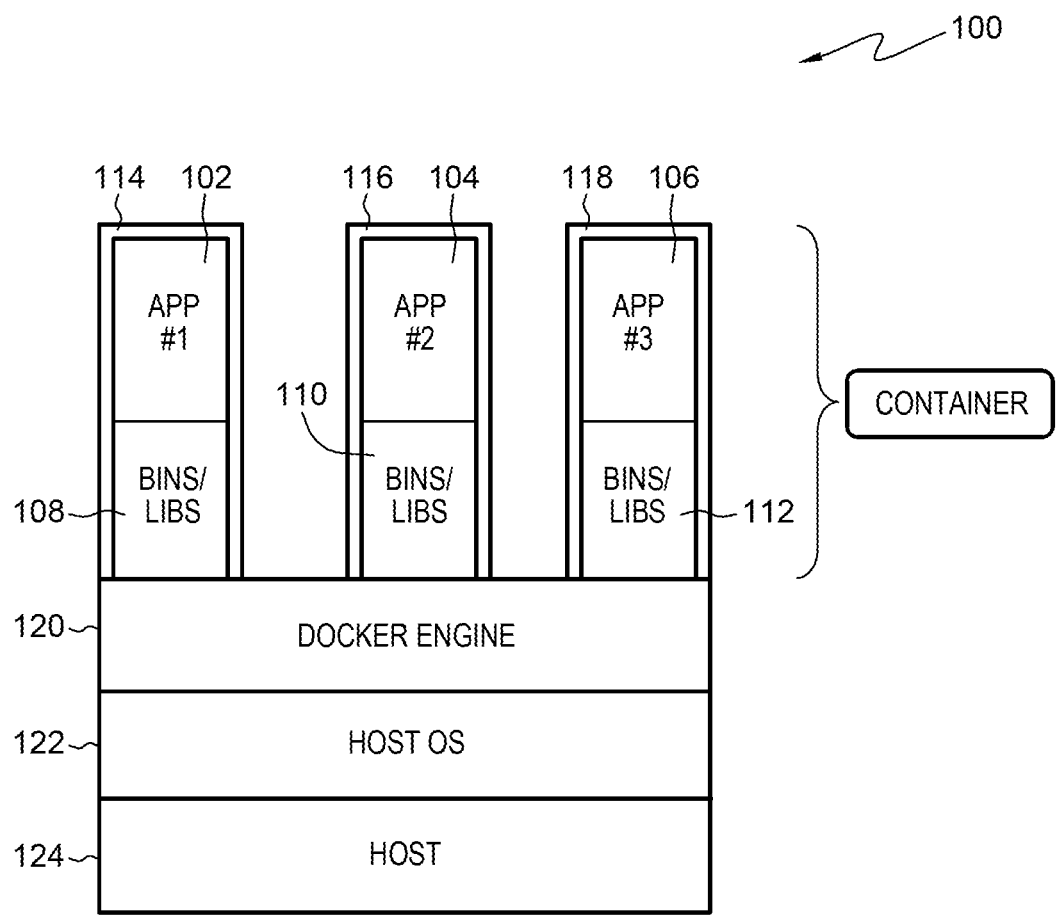
FIG. 1 is a simplified block diagram showing one example of a system employing container-based applications, in accordance with one or more aspects of the present disclosure.

One or more aspect of this disclosure relate, in general, to container-based application recovery. More particularly, one or more aspect of the present disclosure relates to container-based application recovery using a most recent stable version of the corresponding container image.

Disclosed herein, in accordance with one or more aspects of the present invention: A container-based application may have, for example, a micro-service architecture where an application comprises a network of service(s), each service running as an independent container. For proper functioning of an application, all the services should function as understood within the network. When a container is deployed, if something goes wrong with container process and the container terminates, generally in an environment with auto recovery enabled, the terminated container is replaced with a fresh new container. While this helps to make the system resilient, it is not true for all cases.

As used herein, the term "stable" or "stability" when used with respect to containers for applications in computing environments with auto recovery of containers enabled, refers to a container that has not failed for a predetermined amount of time and has not been unhealthy during that time. Also, the term "stability" when used with respect to a container image refers to a quality of the container image. A container image provides the build instructions to spawn a container. In one embodiment, stability of a container image can be measured by, for example, a success rate for a container image (e.g., a healthy event count divided by a sum of healthy and unhealthy event counts expressed, for example, as a percentage). The most recent stable version of a container image among multiple versions may, in that case, be a most recent version with, for example, a highest success rate or one that meets a threshold.

Approximating language that may be used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may" and "may be."

Spatially relative terms, such as "beneath," "below," "lower," "above," "upper," and the like, may be used herein for ease of description to describe one element's or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" or "over" the other elements or features. Thus, the example term "below" may encompass both an orientation of above and below. The device may be otherwise oriented (e.g., rotated 90 degrees or at other orientations) and the spatially relative descriptors used herein should be interpreted accordingly. When the phrase "at least one of" is applied to a list, it is being applied to the entire list, and not to the individual members of the list.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon.

The present invention may be a system, a method, and/or a computer program product at any possible technical detail level of integration. The computer program product may include a computer readable storage medium (or media) having computer readable program instructions thereon for causing a processor to carry out aspects of the present invention.

FIG. 1 is a simplified block diagram showing one example of a system 100 employing container-based applications, for example, applications 102, 104 and 106, in accordance with one or more aspects of the present disclosure. The applications have corresponding bins and libraries 108, 110 and 112, respectively. Together, each application and its corresponding bins/libraries constitute a container 114. Encapsulating the containers are PODs 114, 116 and 118, respectively. The containers are created by a docker engine 120, which sits on top of an operating system 122 of a host 124.

A POD is the basic building block of Kubernetes—the smallest and simplest unit in the Kubernetes object model created and deployed. A POD represents a running process in a distributed computing environment, for example, a computer cluster. A POD encapsulates an application container (or, in some cases, multiple containers) and includes storage resources, a unique network IP, and options that govern how the container(s) should run. A POD represents a unit of deployment: a single instance of an application in Kubernetes, which might consist of either a single container or a small number of containers that are tightly coupled and that share resources.

Each POD is intended to run a single instance of a given application. To scale an application horizontally (e.g., run multiple instances), multiple PODs may be used, one for each instance and referred to as "replication." Replicated PODs may be created and managed as a group by an abstraction called a controller.

PODs are designed as relatively ephemeral disposable entities. When a POD gets created directly or indirectly by, for example, a controller, it is scheduled to run on a node in the computing environment, for example, a cluster computing environment. The POD remains on that node until the process is terminated, the POD object is deleted, the POD is evicted for lack of resources or the node fails.

Restarting a container in a POD should not be confused with restarting the POD. The POD itself does not run, but is an environment the containers run in and persists until it is deleted. Kubernetes uses a higher-level abstraction, called a Controller, that handles the work of managing the relatively disposable POD instances.

Docker is one example of a container runtime used with a Kubernetes POD, however, other container runtimes could be used.

Containers isolate applications and their dependencies into a self-contained unit that can run anywhere. Containers package up just the user space, and not the kernel (or operating system) or any virtual hardware like a virtual machine would. Each container gets its own isolated user space, allowing multiple containers to run on a single host machine. The operating system level architecture is being shared across containers. The only parts that are created from scratch are the bins and libraries. This is what makes containers so "lightweight."

Figure 2:
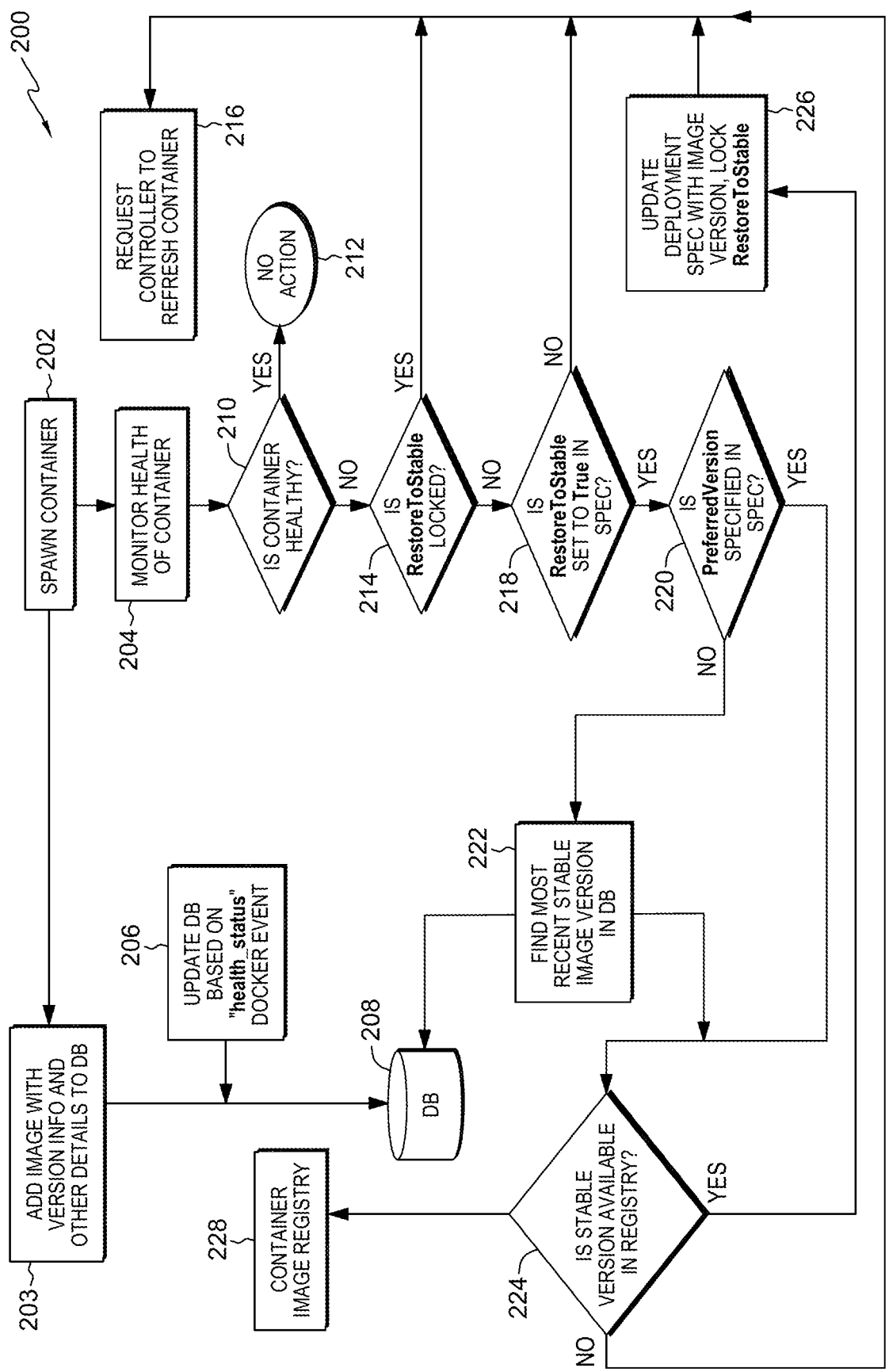
FIG. 2 is a flow diagram for one example of a computer-implemented method of stabilizing a container-based application, in accordance with one or more aspects of the present disclosure.

As prerequisites for a system to apply aspects of the present disclosure, the system needs to have a monitoring service to provide the Mean Time to Failure (MTTF) and Mean Time to Recovery (MTTR), explained in detail with respect to FIG. 2, and an inbuilt health monitoring function. For example, a Kubernetes Liveness probe may be present. Liveness probes will actually attempt to restart a container if it fails. Attributes of a liveness probe include:

initialDelaySeconds—How long to wait before sending a probe after a container starts. For liveness probes this should be safely longer than the time a relevant application usually takes to start up. Without that, you could get stuck in a reboot loop. On the other hand, this value can be lower for readiness probes as you'll likely want traffic to reach your new containers as soon as they're ready;

timeoutSeconds—How long a request can take to respond before it's considered a failure. For example, 1 second may be sufficient; and periodSeconds—How often a probe will be sent. The value set here depends on finding a balance between sending too many probes to a service or going too long without detecting a failure. In one example, a value between about 10 and about 20 seconds may be used.

FIG. 2 is a flow diagram 200 for one example of a computer-implemented method of stabilizing a container-based application, in accordance with one or more aspects of the present disclosure. As noted above, a "stable" container is one that has not failed for a predetermined amount of time and has not been unhealthy during that time, for example, a container which has not failed/was not unhealthy for MaxRetryCount number of times in a given RetryPeriod time, explained more fully below. The method begins with the deployment 202 of a container, including creation of a container deployment specification. A container image for the container, along with version information for the image and possibly other details, is added 203 to database 208. A health of the container is monitored 204, for example, by a controller, as described above, or other process (not shown). Independent process 206 continuously monitors for a "health_status" docker event and updates the database 208 based on a health_status docker event. A health_status event is generated by the docker when a container becomes healthy or unhealthy, which is reflected in a health status, in addition to its normal status. Healthy and unhealthy are determined when a health check instruction is issued, for example, by a controller. If it passes, the container is healthy. If it does not pass for a predetermined number of consecutive failures, the container is deemed to be unhealthy. Whenever a health_status event occurs, the database is updated by the independent process, based on the health_status docker event. Then, an inquiry 210 is made as to whether the container is healthy; if so (a "yes" answer to inquiry 210), no action 212 is taken.

If the container is not healthy (a "no" answer to inquiry 210), an inquiry 214 is made as to whether a RestoreToStable flag is locked. The RestoreToStable flag indicates whether to restore (or "refresh") the relevant container. When this flag is set to true, the most recent stable version of the image is searched for or the preferred version, if provided by the user, is used to bring back the application and lock RestoreToStable to avoid undesired looping. In one example, the RestoreToStable flag may be specified as metadata in a container deployment specification. If the RestoreToStable flag is locked (a "yes" answer to inquiry 214), then a request 216 is made to refresh the container, for example, where there is a controller, the request could be sent to the controller. If the RestoreToStable flag is not locked (a "no" answer to inquiry 214), then an inquiry 218 is made as to whether the RestoreToStable flag is set to "true" in the container deployment specification. If the RestoreToStable flag is not set to "true" (a "no" answer to inquiry 218), then a request 216 is made (to the controller where present) to refresh the container. If the RestoreToStable flag is set to "true" in the container deployment specification (a "yes" answer to inquiry 218), then an inquiry 220 is made as to whether a PreferredVersion of the image is specified in the container deployment specification. If a PreferredVersion of the image is specified (a "yes" answer to inquiry 220), then that version is used to refresh the container. If there is no PreferredVersion specified (a "no" answer to inquiry 220), then a most recent stable image version is found 222 in database 208.

For both possible outcomes of inquiry 220, an inquiry 224 is made as to whether a stable version of the container image is available in the container image registry. If stable version of container image is not available in container image registry 228 (a "no" answer to inquiry 224), then a request 216 is made (to the controller where present) to refresh the container. If there is stable version of the container image available in container image registry (a "yes" answer to inquiry 224), then the method updates 226 the container deployment specification with the available stable version of the container image and locks the RestoreToStable flag, followed by a request 216 sent to refresh the container (e.g., to the controller). In addition to the RestoreToStable flag, there may optionally be an image version list for reference (see example list below). In another example, there could be a MaxRetryCount and RetryPeriod for a maximum number of times to refresh the container in given RetryPeriod time using the current image version, after which a most recent stable version of the image is searched for and used to refresh the container.

RestoreToStable:
    Preferred Version: <list of alternate versions of the image specified by the user. This is optional parameter>.
    MaxRetryCount:1 <default value will be 1. This is the maximum number of retries to be done before going for the stable image replacement>.
    RetryPeriod: <Duration within which the retries should be done. If the value is 1 h, the retries would be considered failure when the container creation fails or becomes unhealthy MaxRetryCount times within a period of 1 hour>.

In one embodiment, determining a quality of a container image in an environment with a docker engine may include, for example, using parameter(s) in addition to a healthy_event_count and an unhealthy_event_count. For example, a success rate of a container image may be used. In one example, the success rate may be the healthy_event_count divided by a total event_count obtained by adding the two counts together and converting to a percentage. In one example, a threshold for the success rate may be used in determining container stability. In another example, a mean time to failure (MTTF) may be used. MTTF represents how long a container can reasonably be expected to run without any restart or without being unhealthy. Containers which have a relatively high value of MTTF, will be more stable. In another example, a mean time to recovery (MTTR) may be used. MTTR represents an average time required to recover a failed container. Ideally, recovery time should be relatively less to consider an image as good quality.

Figure 3:
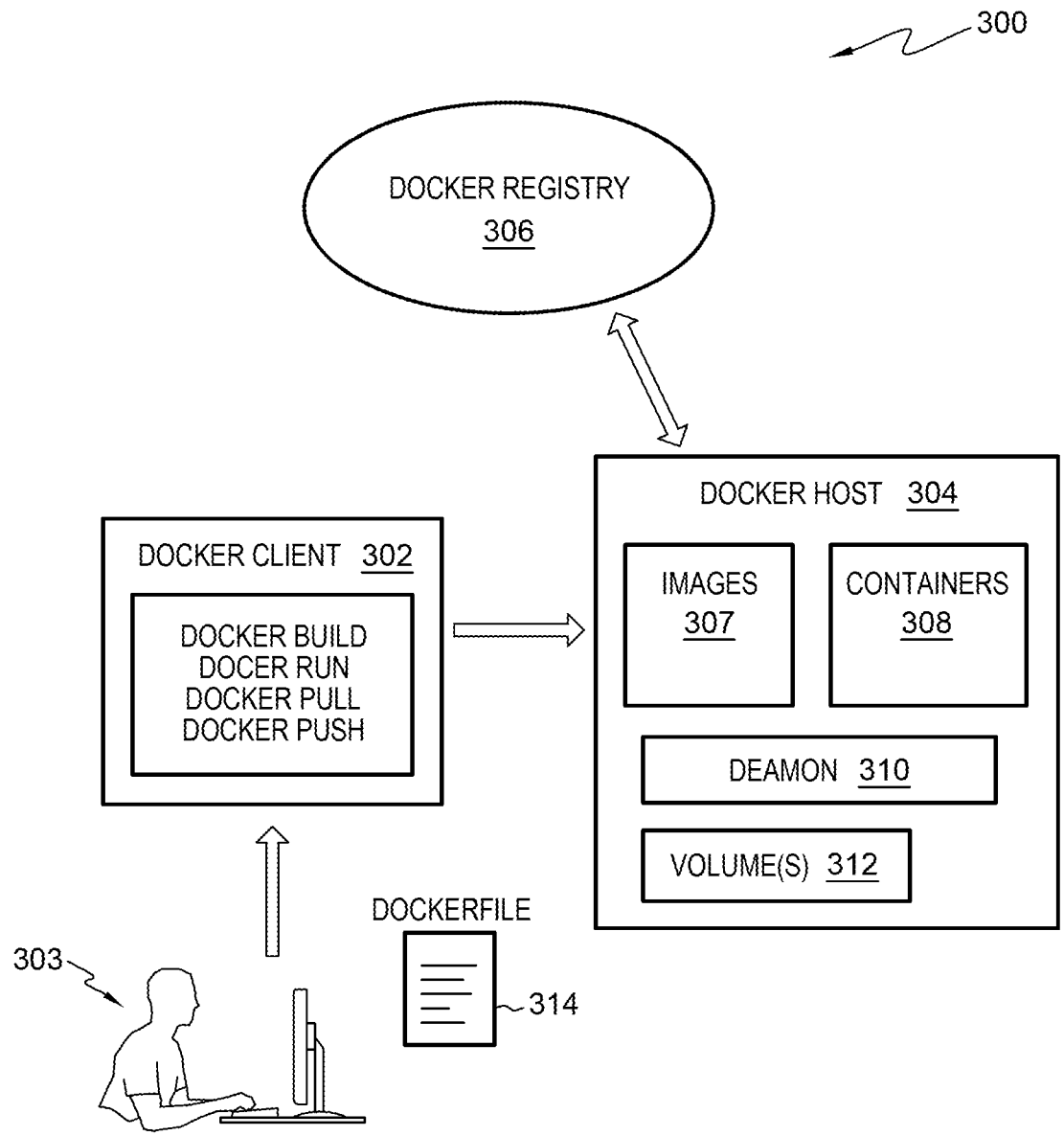
FIG. 3 is a more detailed block diagram of one example of the docker engine of FIG. 1, in accordance with one or more aspects of the present disclosure.

FIG. 3 is a more detailed block diagram 300 of one example of the docker engine of FIG. 2, in accordance with one or more aspects of the present disclosure. The docker engine may include, for example, a docker client 302, a docker host 304 and a docker registry 306. The docker host includes, for example, images 307, one or more container 308, a daemon 310 and one or more volume 312.

A docker engine is a lightweight runtime and tooling that manages containers, images, builds, and more. In one example, a docker engine on a Linux system includes: a docker daemon that runs in the host computer; a docker client that then communicates with the docker daemon to execute commands; and a REST API for interacting with the Docker Daemon remotely.

Representational State Transfer ("REST") is an architectural style that defines a set of constraints to be used for creating web services. Web Services that conform to the REST architectural style, or RESTful web services, provide interoperability between computer systems on the Internet. REST-compliant web services allow the requesting systems to access and manipulate textual representations of web resources by using a uniform and predefined set of stateless operations. Other kinds of web services, such as SOAP (originally, Simple Object Access Protocol) web services, expose their own arbitrary sets of operations.

"Web resources" were first defined on the World Wide Web as documents or files identified by their URLs. However, today they have a much more generic and abstract definition that encompasses everything or entity that can be identified, named, addressed, or handled, in any way whatsoever, on the web. In a RESTful web service, requests made to a resource's URI (Uniform Resource Identifier) will elicit a response with a payload formatted in either HTML, XML, JSON, or some other format. The response can confirm that some alteration has been made to the stored resource, and the response can provide hypertext links to other related resources or collections of resources. When HTTP (Hyper Text Transfer Protocol) is used, as is most common, the operations available are GET, POST, PUT, DELETE, and other predefined CRUD (Create, Read, Update, Delete) HTTP methods.

By using a stateless protocol and standard operations, REST systems aim for fast performance, reliability, and the ability to grow, by re-using components that can be managed and updated without affecting the system as a whole, even while it is running.

The term "representational state transfer" is intended to evoke an image of how a well-designed Web application behaves: it is a network of Web resources (a virtual statemachine) where the user progresses through the application by selecting links, such as /user/tom, and operations such as GET or DELETE (state transitions), resulting in the next resource (representing the next state of the application) being transferred to the user for their use.

Returning to FIG. 3, the docker client is what an end-user 303 of docker, communicates with. The docker client can be analogized to a user interface for docker. Thus, the docker client is a middleman between the user and the docker daemon. The docker daemon is what actually executes commands sent to the docker client—like building, running, and distributing containers. The docker daemon runs on the host machine, but a user never communicates directly with the daemon. The docker client can run on the host machine as well, but it is not required to; the docker client can run on a different machine and communicate with the docker daemon that is running on the host machine. A docker file 314 is where instructions to build a docker image are written.

Disclosed herein is a computer-implemented method for enabling a user to recover an application by checking for and selecting the most recent stable image version of the corresponding container among various available versions of that particular image.

The system disclosed herein allows a user to opt for app recovery using the most recent stable image version among the various versions available of that particular image. It will check for the most stable version of that image and deploy the container using this version of the image. In one embodiment, a controller will take care of searching for the most recent stable version of the image and updating the container deployment template with the most recent stable image version.

A process as disclosed herein will monitor the events generated by a docker engine and keep track of the actions. This process will update the database whenever there is a "health_status" event triggered by the docker-engine. Entries in the database may, for example, have the following format, though other formats may instead be used:

Image Title: <image-name>
Version: <tag/version>
healthy_event_count: <number>
unhealthy_event_count: <number>
success_rate_of_version: <percentage>

When a container has a healthcheck specified, it has a health status in addition to its normal status. This status is, for example, initially "starting." Whenever a health check passes, it becomes healthy (whatever state it was previously in). After a certain number of consecutive health check failures, it becomes unhealthy. This will generate the health_status event and a count of number of unhealthy and healthy events are maintained in the database.

In one example, there can be a threshold to check for the historical percentage of success of each version used. Any image which qualifies the nearest to a threshold value, for example, is selected for container deployment.

In one example, the deployment file can be created using YAML (Yet Another Markup Language) having a ".yaml" extension. Deployment templates written in YAML, are used by Kubernetes for creating resources like a POD or any K8S object, and may have a flag to enable or disable the app recovery using the most recent stable image. If this is set to true, the controller may, for example, search the most recent stable image from the database and update the deployment YAML file.

Certain embodiments herein may offer various technical computing advantages involving computing advantages to address problems arising in the realm of computer networks. Particularly, embodiments herein stabilize a container-based application by using a most recent stable version of the image for the container. Various decision data structures can be used to drive artificial intelligence (AI) decision making, such as decision data structure. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

In one example, a cognitive computer system may be employed. In general, the term "cognitive computing" (CC) has been used to refer to new hardware and/or software that mimics the functioning of the human brain and helps to improve human decision-making, which can be further improved using machine learning. In this sense, CC is a new type of computing with the goal of more accurate models of how the human brain/mind senses, reasons, and responds to stimulus. CC applications link data analysis and adaptive page displays (AUI) to adjust content for a particular type of audience. As such, CC hardware and applications strive to be more effective and more influential by design.

Some common features that cognitive systems may express include, for example: ADAPTIVE—they may learn as information changes, and as goals and requirements evolve. They may resolve ambiguity and tolerate unpredictability. They may be engineered to feed on dynamic data in real time, or near real time; INTERACTIVE—they may interact easily with users so that those users can define their needs comfortably. They may also interact with other processors, devices, and Cloud services, as well as with people; ITERATIVE AND STATEFUL—they may aid in defining a problem by asking questions or finding additional source input if a problem statement is ambiguous or incomplete. They may "remember" previous interactions in a process and return information that is suitable for the specific application at that point in time; and CONTEXTUAL—they may understand, identify, and extract contextual elements such as meaning, syntax, time, location, appropriate domain, regulations, user's profile, process, task and goal. They may draw on multiple sources of information, including both structured and unstructured digital information, as well as sensory inputs (e.g., visual, gestural, auditory and/or sensor-provided).

Cognitive computing is the simulation of human thinking, using software and/or hardware, which may be enhanced/improved using machine learning. Machine learning is based in mathematics and statistical techniques, giving computer systems the ability to "learn" with data provided, e.g., a relatively large amount of data, without the need to be explicitly programmed. The goal of cognitive computing is to create automated systems capable of solving problems without human assistance, broadly referred to as Artificial Intelligence (AI).

This disclosure allows a user to opt for application recovery using the most stable image version among the various versions available of that particular image. It will check for the most stable version of that image and deploy the container using this version of the image. Controller will take care of searching the stable version of the image and updating the deployment template with stable image version.

Various decision data structures can be used to drive artificial intelligence (AI) decision making, such as decision data structure that intelligently stabilizes a container-based application by automatically replacing an unstable container image version with a most recent stable version in a deployment specification. This reduces downtime of an application as compared to conventional auto-recovery. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead.

For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio or other signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience.

As used herein, the term "real-time" refers to a period of time necessary for data processing and presentation to a user to take place, and which is fast enough that a user does not perceive any significant delay. Thus, "real-time" is from the perspective of the user.

In a first aspect, disclosed above is a computer-implemented method of stabilizing a container-based application. The computer-implemented method includes: determining a health of a container, resulting in a container health value; based on the container health, identifying a most recent stable version of an image for the container; and deploying the container using the most recent stable version of the image for the container.

In one example, determining the container health may include, for example: determining whether the container has not failed for a predetermined amount of time and has not been unhealthy during the predetermined amount of time. In one example, the computer-implemented method may further include, for example, refreshing the container based on a RestoreToStable flag in a deployment specification of the container being one of locked and set to false.

In one example, the container in the computer-implemented method of the first aspect may be, for example, unhealthy and the identifying may include, for example, identifying a most recent stable version of an image for the container having a RestoreToStable flag in a deployment specification of the container unlocked and set to true. In one example, the identifying may also, for example, be based on an absence of a Preferred Version of the container image.

In one example, the computer-implemented method of the first aspect may further include, for example, prior to deploying, updating a deployment specification for the container with the most recent stable version of the image resulting from the identifying and locking a RestoreToStable flag in the deployment specification for the container.

In one example, the container in the computer-implemented method of the first aspect may be, for example, managed by a POD having a controller, and the controller performs the identifying. In one example, controller performs the updating.

In one example, the computer-implemented method of the first aspect may further include, for example, storing the most recent stable version of the image and corresponding version information in a database storing image versions of the container.

In a second aspect, disclosed above is a system for recommending actions for stabilizing a container-based application. The system includes: a memory; and at least one processor in communication with the memory to perform a method, the method including: determining a health of a container, resulting in a container health value; based on the container health, identifying a most recent stable version of an image for the container; and deploying the container using the most recent stable version of the image for the container.

In one example, determining the container health may include, for example: determining whether the container has not failed for a predetermined amount of time and has not been unhealthy during the predetermined amount of time. In one example, the method may further include, for example, refreshing the container based on a RestoreToStable flag in a deployment specification of the container being one of locked and set to false.

In one example, the container in the system of the second aspect may be, for example, unhealthy and the identifying may include, for example, identifying a most recent stable version of an image for the container having a RestoreToStable flag in a deployment specification of the container unlocked and set to true.

In one example, the container in the system of the second aspect may be, for example, managed by a POD having a controller, and the controller performs the identifying. In one example, controller performs the updating.

In a third aspect, disclosed above is a computer program product for stabilizing a container-based application. The computer program product includes: a medium readable by a processor and storing instructions for performing a method of sending notifications, the method including: determining a health of a container, resulting in a container health value; based on the container health, identifying a most recent stable version of an image for the container; and deploying the container using the most recent stable version of the image for the container.

In one example, determining the container health may include, for example: determining whether the container has not failed for a predetermined amount of time and has not been unhealthy during the predetermined amount of time. In one example, the computer program product may further include, for example, refreshing the container based on a RestoreToStable flag in a deployment specification of the container being one of locked and set to false.

In one example, the container in the computer program product of the third aspect may be, for example, unhealthy and the identifying includes identifying a most recent version of an image for the container having a RestoreToStable flag in a deployment specification of the container unlocked and set to true.

In one example, the container in the computer program product of the third aspect may be, for example, managed by a POD having a controller, and the controller performs the identifying. In one example, controller performs the updating.

Figure 4:
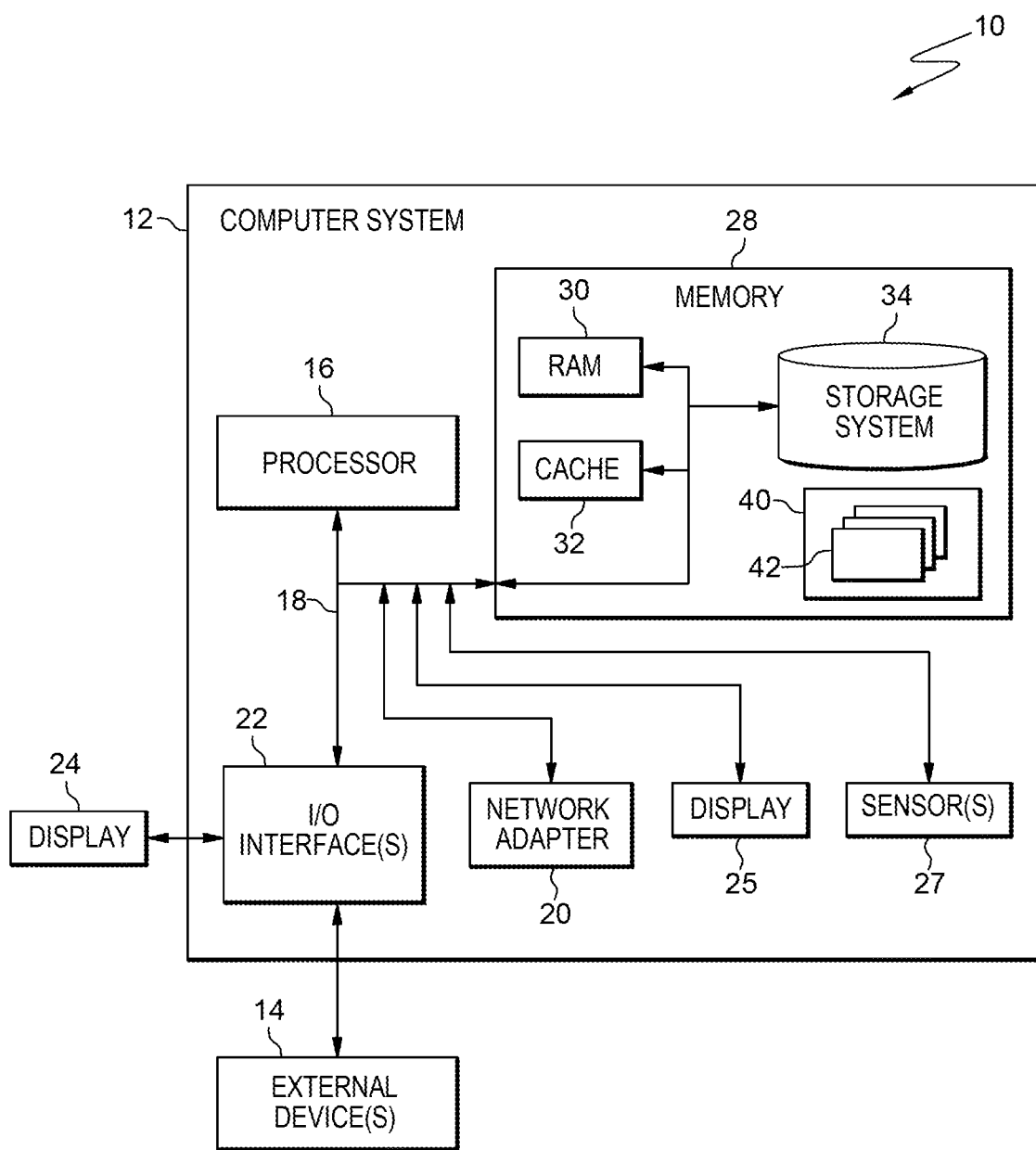
FIG. 4 is a block diagram of one example of a computer system, in accordance with one or more aspects of the present disclosure.
Figure 5:
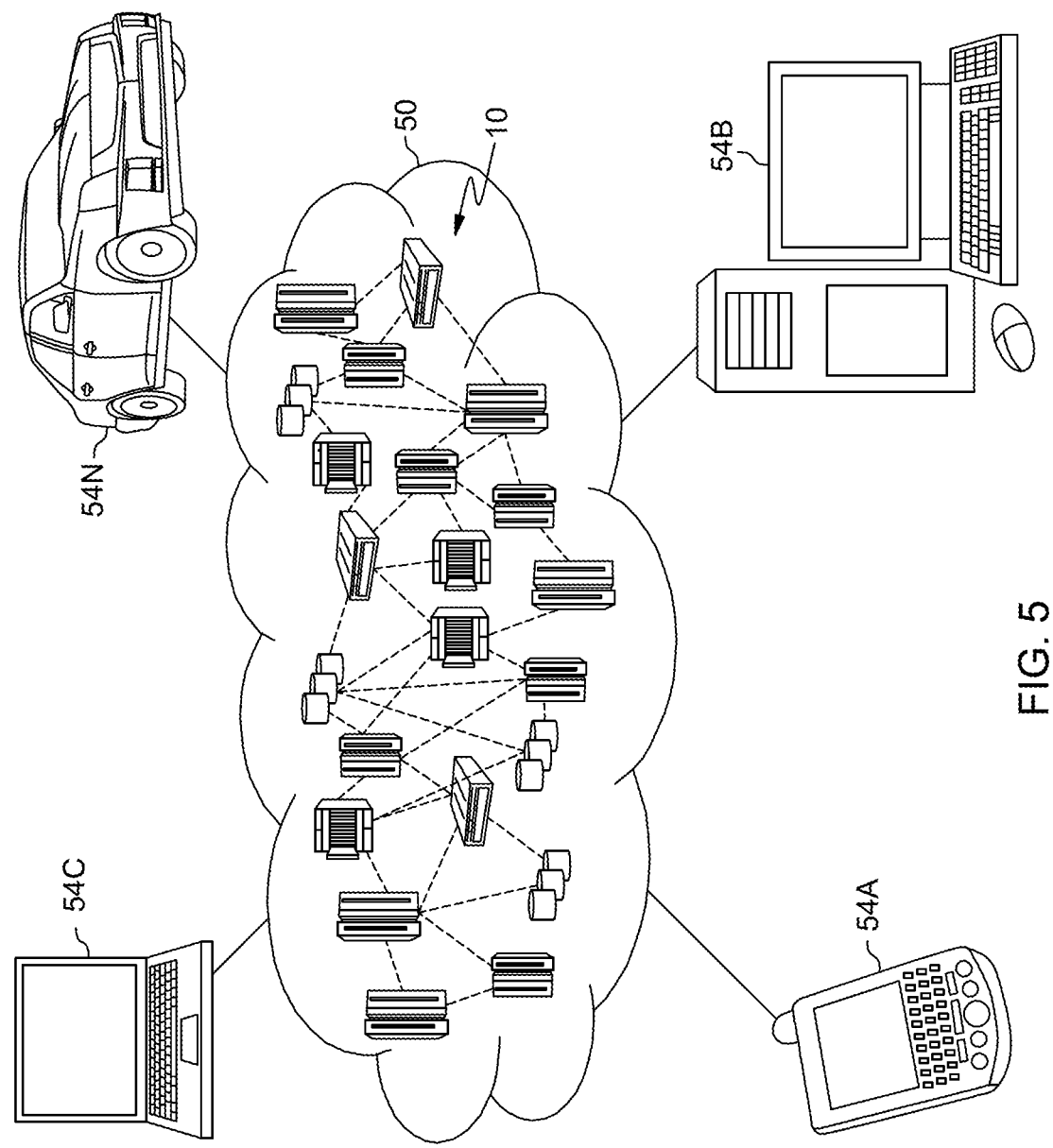
FIG. 5 is a block diagram of one example of a cloud computing environment, in accordance with one or more aspects of the present disclosure.
Figure 6:
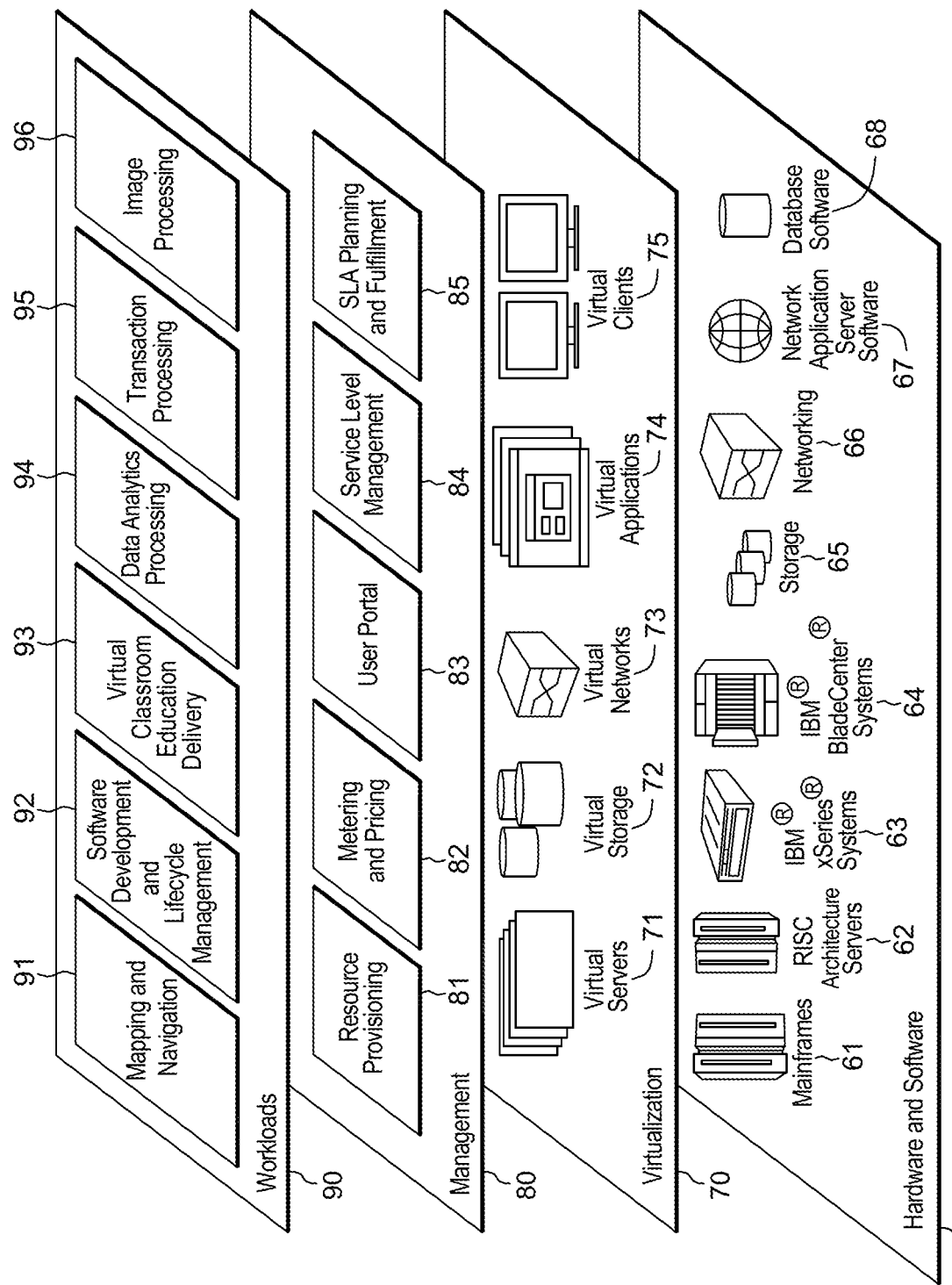
FIG. 6 is a block diagram of one example of functional abstraction layers of the cloud computing environment of FIG. 5, in accordance with one or more aspects of the present disclosure.

FIGS. 4-6 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 4, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 5-6.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. One or more program 40 including program processes 42 can define machine logic to carry out the functions set forth herein. In one embodiment, the system can include one or more computing node 10 and can include one or more program 40 for performing functions described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. Computer system 12 can include one or more network adapter 20. In FIG. 5, computing node 10 is described as being implemented in a cloud computing environment and accordingly is referred to as a cloud computing node in the context of FIG. 5.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for establishing and updating geofence locations as set forth herein. The processing components 96 can be implemented with use of one or more program 40 described in FIG. 4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

The invention claimed is:

1. A computer-implemented method of stabilizing a container-based application, the computer-implemented method comprising:
   determining a health of a container, resulting in a container health value;
   based on the container health value, identifying a most recent stable version of an image for the container from among a plurality of image versions, wherein the container health value comprises a success rate for the container of healthy events to total health events during a predetermined amount of time and wherein the total health events comprises healthy and unhealthy events occurring during the predetermined time;
   deploying the container using the most recent stable version of the image for the container; and prior to deploying, updating a deployment specification for the container with the most recent stable version of the image resulting from the identifying and updating a corresponding flag based on the updating.

2. The computer-implemented method of claim 1, wherein determining the container health value comprises determining whether the container had any unhealthy events during the predetermined amount of time.

3. The computer-implemented method of claim 2, further comprising refreshing the container based on a RestoreToStable flag in a deployment specification of the container being one of locked and set to false.

4. The computer-implemented method of claim 1, wherein the container is unhealthy and wherein the identifying comprises identifying a most recent version of an image for the container having a RestoreToStable flag in a deployment specification of the container unlocked and set to true.

5. The computer-implemented method of claim 4, wherein the identifying is also based on an absence of a Preferred Version of the container image.

6. The computer-implemented method of claim 1, wherein the updating the corresponding flag comprises locking a RestoreToStable flag in the deployment specification for the container.

7. The computer-implemented method of claim 1, wherein the container is managed by a POD having a controller, and wherein the controller performs the identifying.

8. The computer-implemented method of claim 7, wherein the controller performs the updating.

9. The computer-implemented method of claim 1, further comprising storing the most recent stable version of the image and corresponding version information in a database storing a plurality of image versions of the container.

10. A system for stabilizing a container-based application, the system comprising:
 a memory; and
 at least one processor in communication with the memory, the memory storing program code to perform a method for stabilizing a container-based application, the method comprising:
  determining a health of a container, resulting in a container health value;
  based on the container health value, identifying a most recent stable version of an image for the container from among a plurality of image versions, wherein the container health value comprises a success rate for the container of healthy events to total health events during a predetermined amount of time and wherein the total health events comprises healthy and unhealthy events occurring during the predetermined time;
  deploying the container using the most recent stable version of the image for the container; and
  prior to deploying, updating a deployment specification for the container with the most recent stable version of the image resulting from the identifying and updating a corresponding flag based on the updating.

11. The system of claim 10, wherein determining the container health value comprises determining whether the container has had any unhealthy events during the predetermined amount of time.

12. The system of claim 11, further comprising refreshing the container based on a RestoreToStable flag in a deployment specification of the container being one of locked and set to false.

13. The system of claim 10, wherein the container is unhealthy and wherein the identifying comprises identifying a most recent version of an image for the container having a RestoreToStable flag in a deployment specification of the container unlocked and set to true.

14. The system of claim 10, wherein the container is managed by a POD having a controller, wherein the controller performs the identifying and updating.

15. A computer program product for stabilizing a container-based application, the computer program product comprising:
 a computer readable storage medium readable by a processor and storing instructions for performing a method of stabilizing a container-based application, the method comprising:
  determining a health of a container, resulting in a container health value;
  based on the container health value, identifying a most recent stable version of an image for the container from among a plurality of image versions, wherein the container health value comprises a success rate for the container of healthy events to total health events during a predetermined amount of time and wherein the total health events comprises healthy and unhealthy events occurring during the predetermined time;
  deploying the container using the most recent stable version of the image for the container; and
  prior to deploying, updating a deployment specification for the container with the most recent stable version of the image resulting from the identifying and updating a corresponding flag based on the updating.

16. The computer program product of claim 15, wherein determining the container health value comprises determining whether the container has had any unhealthy events during the predetermined amount of time.

17. The computer program product of claim 16, further comprising refreshing the container based on a RestoreToStable flag in a deployment specification of the container being one of locked and set to false.

18. The computer program product of claim 15, wherein the container is unhealthy and wherein the identifying comprises identifying a most recent version of an image for the container having a RestoreToStable flag in a deployment specification of the container unlocked and set to true.

19. The computer program product of claim 15, wherein the container is managed by a POD having a controller, wherein the controller performs the identifying.

20. The computer program product of claim 19, wherein the controller performs the updating.

* * * * *